United States Patent [19]

Ishigami et al.

[11] 4,437,372

[45] Mar. 20, 1984

[54] SHEARING MACHINE

[75] Inventors: Hideo Ishigami, Kawasaki; Nobuo Tohei, Mishima, both of Japan

[73] Assignee: Kabushiki Kaisha Meidensha, Tokyo, Japan

[21] Appl. No.: 331,327

[22] Filed: Dec. 16, 1981

[30] Foreign Application Priority Data

Dec. 20, 1980 [JP] Japan ............................... 55-181080

[51] Int. Cl.³ ..................... B23D 25/06; B26D 1/60
[52] U.S. Cl. ....................................... 83/320; 83/639
[58] Field of Search ................ 83/318, 319, 320, 639; 72/453.01, 453.18; 137/625.24, 625.23

[56] References Cited

U.S. PATENT DOCUMENTS

| | | | |
|---|---|---|---|
| 2,079,974 | 11/1933 | Traut | 83/318 |
| 2,582,332 | 10/1946 | Homer | 83/318 |
| 2,755,858 | 7/1956 | Siegerist | 83/318 |
| 3,125,918 | 3/1964 | Small | 83/318 |
| 3,566,728 | 3/1971 | Ohmasu | 83/319 |
| 3,581,616 | 6/1971 | Kawae et al. | 83/320 |
| 3,730,223 | 5/1973 | Reece | 137/625.23 |
| 3,945,284 | 3/1976 | Wetzels et al. | 83/318 |
| 4,143,676 | 3/1979 | Ivony et al. | 137/625.23 |
| 4,165,665 | 8/1979 | Shimizu et al. | 83/318 |

FOREIGN PATENT DOCUMENTS 868053  5/1961  United Kingdom ................. 83/319

Primary Examiner—E. R. Kazenske
Assistant Examiner—Hien H. Phan
Attorney, Agent, or Firm—Lowe, King, Price & Becker

[57] ABSTRACT

A shearing machine for cutting off a material being continuously fed at a constant high speed into a relatively short lengths requiring adjustment of the revolution speed of a driving motor only within a relatively small range. The shearing machine comprises mainly three sections: a reciprocating mechanism driven by a motor to move cutters horizontally, a travelling assembly and double-acting cylinder to drive a movable cutter vertically while being moved horizontally, and a two-way rotary valve driven by the motor to control the double-acting cylinder device in conjuinction with movement of the reciprocating mechanism. The reciprocating mechanism translates rotary torque into reciprocating linear motion of relatively small stroke length. The two-way rotary valve is driven directly by the motor, facilitating synchronization of horizontal cutter speed with material feed speed and rapid movement of the cutters without any response delay.

4 Claims, 8 Drawing Figures

SHEARING MACHINE

BACKGROUND OF THE INVENTION

1. Field of the Invention

The present invention relates generally to a shearing machine, and more specifically to a shearing machine used to cut off material being continuously fed into predetermined lengths.

2. Description of the Prior Art

In an electric-welded tube manufacturing installation which can mass-produce, for instance, relatively thin-walled and relatively small-diameter electric welded tubes, there is generally a shearing machine at the last manufacturing stage which can cut a material into predetermined dimensions while the material is being continuously fed in a straight line.

As the above-mentioned shearing machine, a scotch-yoke type is well known, in which a rotating arm is used to move a movable cutter downward to cut off a material and to move a pair of fixed and movable cutters horizontally. In this case, it is necessary to synchronize the horizontal speed of the cutters with the horizontal speed of the material to be cut at least during the cutting period, in order to prevent the cutters from being broken.

In such a shearing machine, however, since the circular motion of the rotating arm is not constant in the horizontal direction speed, it is necessary to adjust the revolution speed of the driving motor at short time intervals by using an appropriate speed adjusting device. In order to achieve sufficiently accurate speed control, it is necessary to use a motor with relatively large capacitance ratings.

Additionally, in this case, there exist some functional limitations such as the cutting depth and the length of material to be cut.

To overcome these problems, another shearing machine has been employed in which a double-acting hydraulic cylinder device controlled independently by electromagnetic valves is used for moving the movable cutter downward to cut off the work material. In this shearing machine, however, since the electromagnetic valves entail a response delay, when the material to be cut is fed at a high speed, it is practically impossible to cut the material accurately into an appropriate length.

A more detailed description of the representative prior-art shearing machine will be made with reference to the attached drawing under DETAILED DESCRIPTION OF THE PREFERRED EMBODIMENTS.

SUMMARY OF THE INVENTION

With these problems in mind therefore, it is the primary object of the present invention to provide a shearing machine for cutting off a material, being continuously fed at a constant high speed in a straight line, into short lengths which requires adjustment of the revolution speed of the driving motor only within a relatively small range, in other words, which requires only a small driving motor.

To achieve the above-mentioned object, the shearing machine for cutting off material being continuously fed into predetermined lengths according to the present invention comprises an adjustable speed motor, a plurality of guide rods to guide a pair of movable and fixed cutters parallel to the material feed direction, a travelling assembly to which to secure the fixed cutter and to slidably support the movable cutter, a double-acting hydraulic cylinder device to move the movable cutter vertically, a reciprocating mechanism to move the travelling assembly horizontally in synchronization with the material feed speed, and a two-way rotary valve to charge or discharge a working fluid into or out of the double-acting cylinder device.

BRIEF DESCRIPTION OF THE DRAWINGS

The features and advantages of the shearing machine according to the present invention will be more clearly appreciated from the following description taken in conjunction with the accompanying drawings in which like reference numerals designate corresponding elements and in which.

DETAILED DESCRIPTION OF THE PREFERRED EMBODIMENTS

To facilitate understanding of the present invention, a brief reference will be made to a representative prior art shearing machine used to cut off material being continuously fed into predetermined lengths, with reference to the attached drawings.

In a pipe manufacturing installation for mass-producing, for instance, relatively thin-walled and relatively small-diameter electric-welded tubes, there is generally a shearing machine at the last stage of manufacture which can cut off material into predetermined lengths while the material is continuously being fed in a straight line at a constant speed.

Figure 1:
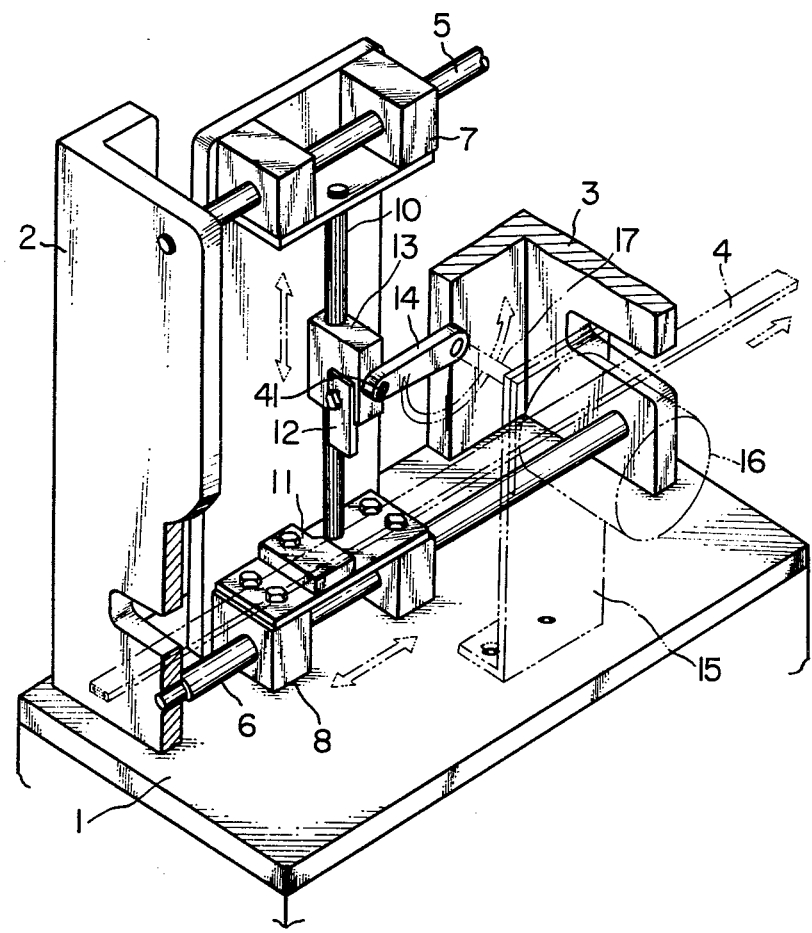
FIG. 1 is a fragmentary perspective view showing a representative prior-art shearing machine used to cut off material being continuously fed into predetermined lengths.

It is well known to use a shearing machine of the scotch-yoke type for the above-described purpose. As shown in FIG. 1, in a shearing machine of this type, two horizontal guide rods 5 and 6, each extending in the direction parallel to the feed direction of a strip of a material 4 to be cut, are supported so as to be spaced apart by two support frames 2 and 3 vertically fixed to a base frame 1. A pair of horizontally-travelling members 7 and 8 are slidably fitted to horizontal guide rods 5 and 6 respectively. A movable cutter guide rod of a spline axle 10 extending perpendicular to the feed direction of the material is supported between the two horizontally-travelling members 7 and 8. A cutter holder 13, having a movable cutter 12 fixed thereon, is fitted to the movable cutter guide rod 10 so as to be movable up and down. A fixed cutter 11 is fixed to the lower travelling member 8. Fixed cutter 11 can move horizontally along horizontal guide rod 6, and movable cutters 12 also move horizontally with vertical cutter guide rod 10 and vertically therealong.

To drive both the above-mentioned movable and fixed cutters 12 and 11 horizontally and/or vertically, there is provided a swivel arm 14 rotating in a vertical plane parallel to the line along which the material to be cut is continuously fed, one end of which is rotatably supported by cutter holder 13 and the other end of which is fixedly supported by drive shaft 17 of an adjustable speed motor 16 fixed to a motor support frame 15 disposed basically perpendicular to base frame 1.

In the aforesaid prior-art shearing machine, when swivel arm 14 is rotated counterclockwise (in FIG. 1) by motor 16, movable cutter 12 moves up and down with respect to fixed cutter 11 to shear off material 4 to be cut, and also both the movable and fixed cutters move reciprocally along the line in which the material is fed. Material 4 is horizontally fed at roughly constant speed by another conveying device (not shown).

Variation in vertical speed of movable cutter 12 during a single cutting cycle, can occur without damaging to the cutters; however, if the horizontal speed of of the movable and fixed cutters varies during the cutting cycle, it may be impossible to cut the moving material without damaging the cutters. In other words, it is necessary to match cutter speed to material feed speed, at least during actual shearing.

As swivel arm 14 rotates in a constant circular motion, the horizontal speed of the cutters, that is, the horizontal component of the motion of the pivot pin 14 of the swivel arm 14 follows a cosine curve. Therefore, it is necessary to continuously vary the instantaneous revolution speed of motor 16 so that the horizontal speed component of the cutters matches the constant horizontal speed of the material at least when cutting occurs. For instance, in the case where one-quarter revolution of the swivel arm 14 is required to shear off the material, it is necessary to continuously and accurately adjust the revolution speed of the motor through more than 40 percent in a very short period via an electrical motor speed adjusting device (not shown).

Since a relatively powerful motor 16 must be used to ensure accurate speed control, the cut depth, in other words, the stroke of movable cutter 12 is severely limited since the speed adjustment range increases with the increasing depth of cut. Thus, the minimum length to which the material can be cut is limited.

To overcome these aforesaid problems, there is commonly employed another shearing machine in which two independent driving means are used, one for moving the cutters horizontally in the feed direction of material the other for moving the movable cutter vertically in the direction perpendicular thereto. In this case, usually, a double-acting hydraulic cylinder movable horizontally together with the movable and fixed cutters is used only to move the movable cutter vertically to cut the material. In this case, usually the double-acting hydraulic cylinder is controlled by electromagnetic valves which switch between charging a working fluid thereinto or discharging the fluid therefrom. In this prior-art shearing machine, however, since the hydraulic cylinder is irregularly delayed by more than 20 ms when the working fluid direction is switched by the electromagnetic valves, in the case where the speed feed of the material to be cut is about 120 m/min, it is impossible to accurately cut the material off into lengths, for instance, less than about 1.5 m.

In view of the above description, reference is now made to a preferred embodiment of the shearing machine according to the present invention.

Figure 2:
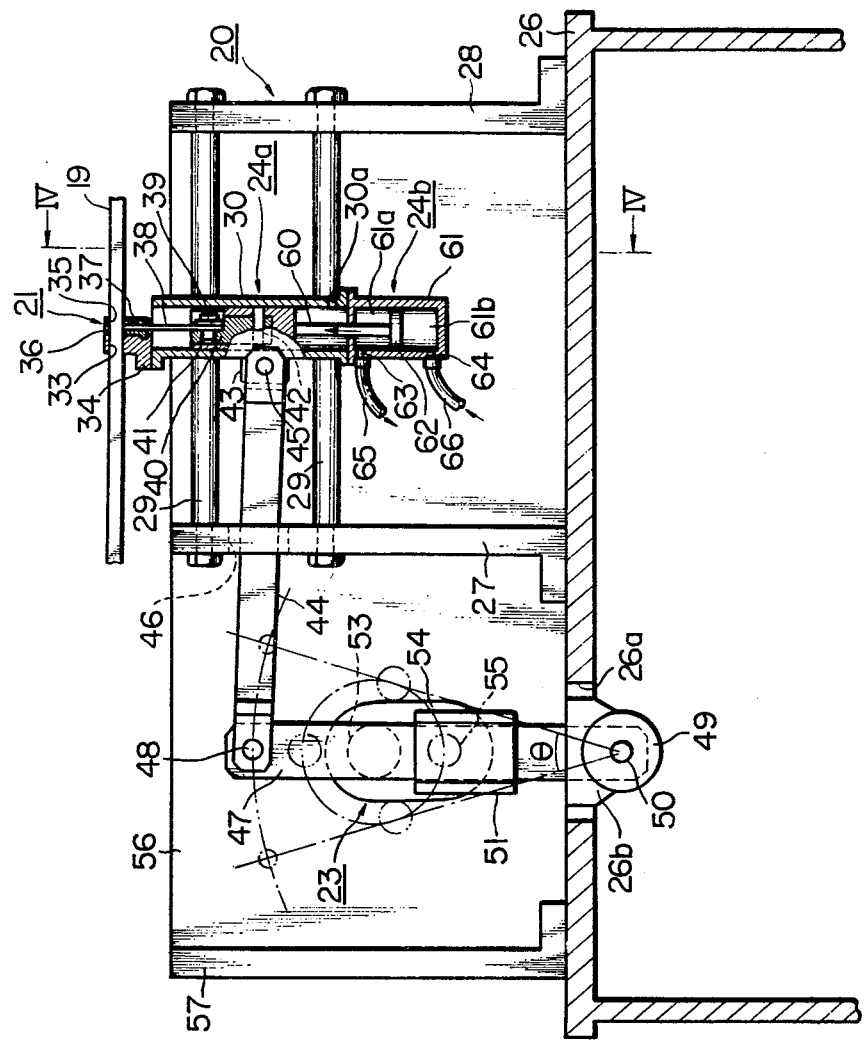
FIG. 2 is a front view partly in section of a shearing machine according to the present invention.
Figure 3:
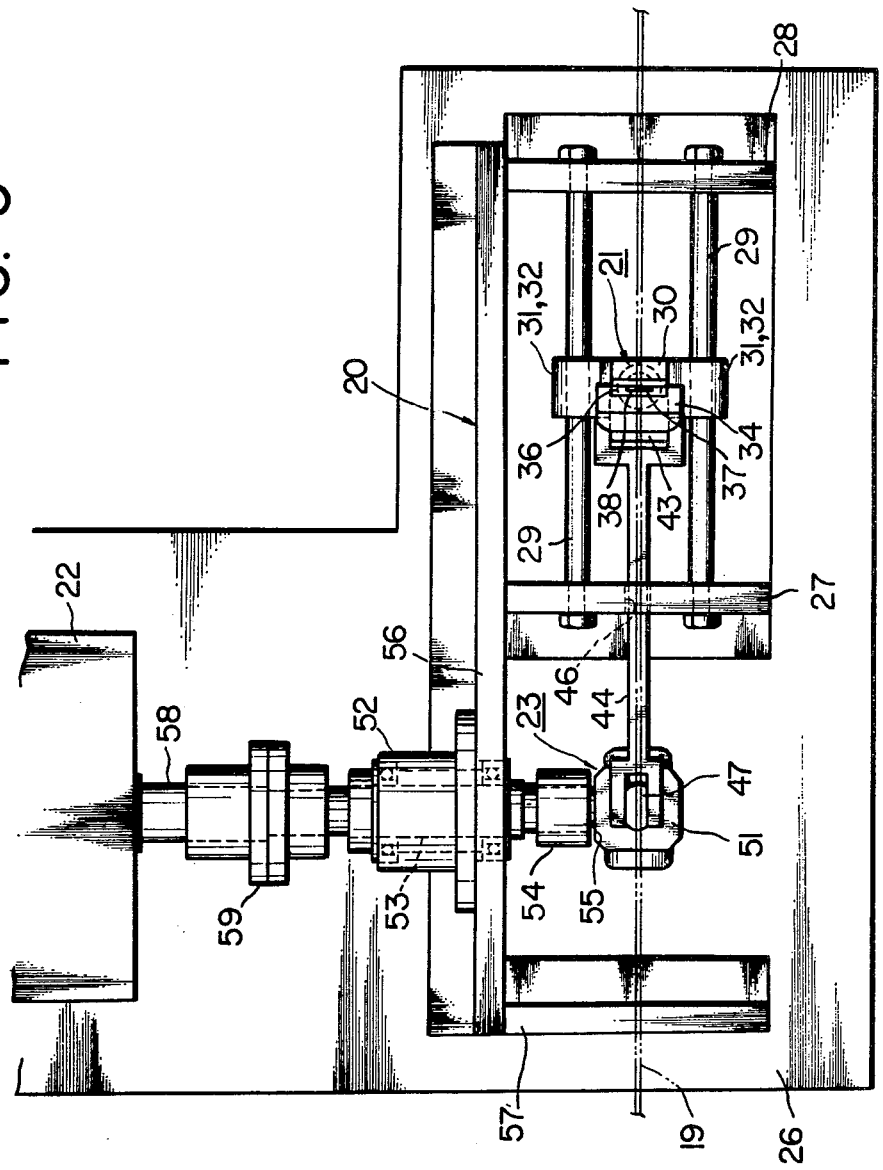
FIG. 3 is a fragmentary plan view of the shearing machine according to the present invention.
Figure 4:
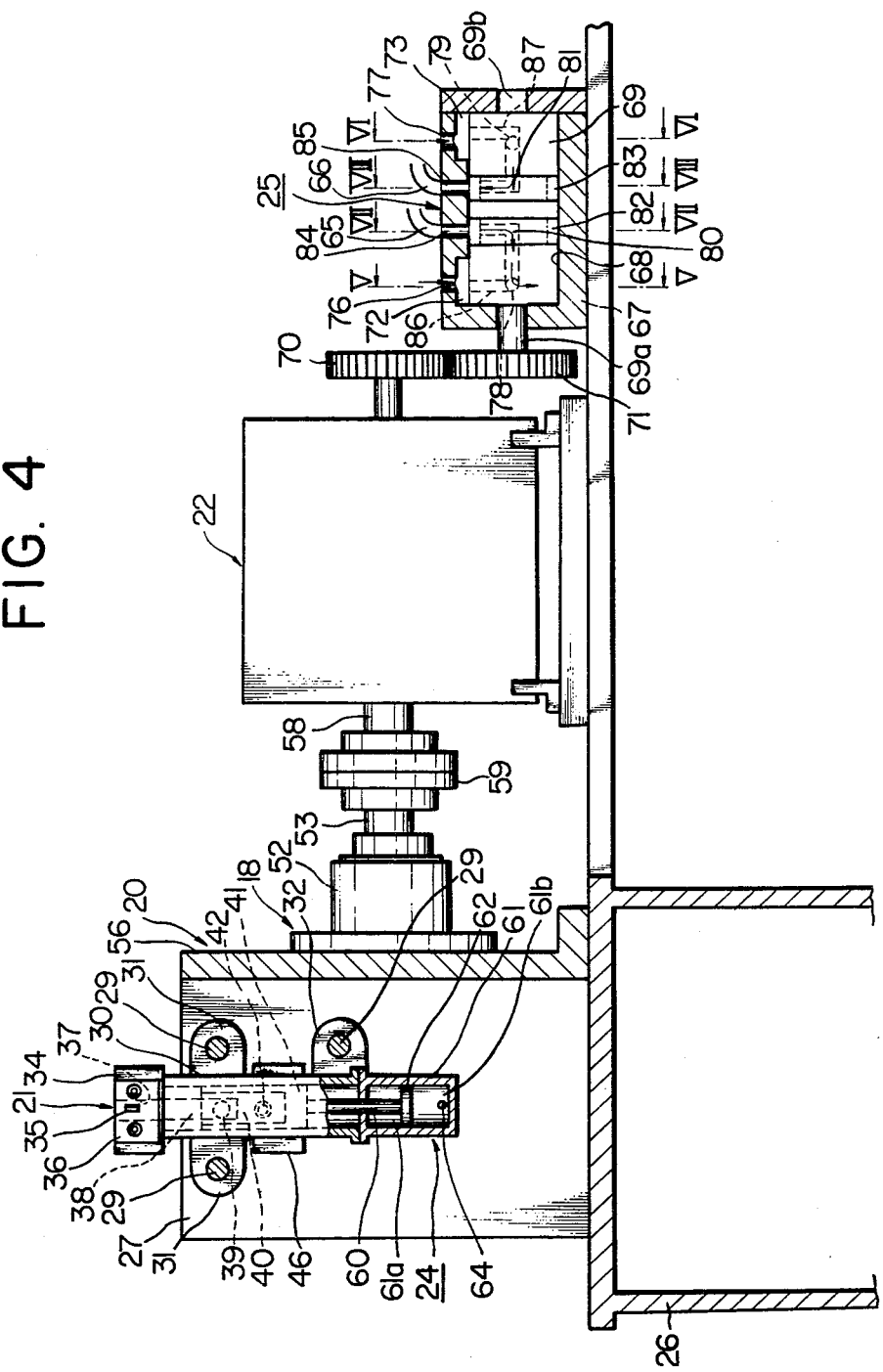
FIG. 4 is a cross-sectional view taken along the lines IV—IV in FIG. 2.

With reference to FIGS. 2, 3 and 4, the shearing machine for cutting material continuously fed at a constant speed into predetermined lengths according to the present invention mainly comprises three sections: a reciprocating mechanism section 23 (quick-return motion mechanism) driven by a motor to move the movable and fixed cutters horizontally in the feed direction, a travelling assembly (24a) and double-acting hydraulic cylinder device (24b) section 24 to drive the movable cutter vertically while being moved horizontally by the reciprocating mechanism, and a two-way rotary valve section 25 driven by a motor to control the double-acting hydraulic cylinder section by switching the direction of a working fluid charged thereinto or discharged therefrom.

In the figures, the reference numeral 26 denotes a bed, and the numeral 20 denotes a set of frames including a first rod support frame 27, a second rod support frame 28, an auxiliary support frame 57 and a bearing support frame 56.

A motor 22 is fixed to bed 26. Motor 22 includes a drive shaft 58, one end of which is connected to a coupling 59 to drive reciprocating mechanism section 23 and the other end of which is connected to a gear 70 to drive two-way rotary valve section 25.

First will be described the reciprocating mechanism section 23 for moving the movable and fixed cutters horizontally in the feed direction, with reference particularly to FIGS. 2 and 3.

The torque of motor 22 is transmitted to a driven shaft 53 through coupling 59. The drive shaft 53 is supported by a bearing case 52 fixed to bearing support frame 56. At one end of drive shaft 53 there is fixed a crank lever 54 rotatable about the center of the drive shaft. To the outer end of crank lever 54 there is provided an axle 55 carrying a flying slide 51. Through flying slide 51 there is passed a slide link 47 rotatably supported by an axle 50 fixed to a angled portion 26b projecting from a hole 26a formed in bed 26. A bearing bracket 49 supports slide link 47 on the angled portion.

When drive shaft 53 rotates, crank lever 54 also rotates to move flying slide 51 up and down, so that slide link 47 oscillates within the range shown by the dotted and dashed lines in FIG. 2, determined by the tangents to the path of axle 55, also shown in FIG. 2. These tangent positions divide the path of axle 55 into two unequal arc-lengths, the longer of which corresponds to the feed direction of material 19 and the shorter of which constitutes a quick-return stroke of reciprocating mechanism 23. To one end of slide crank 47 there is connected a connecting link 44 passing through a slot 46 in rod support frame 27 to move the travelling assembly and double-acting cylinder section 24 horizontally to which a set of movable and fixed cutters are attached. The reciprocating mechanism thus constructed is called a slider crank mechanism, a type of a quick-return mechanism.

Next will be described the travelling assembly and double-acting hydraulic cylinder section 24.

On bed 26 there are vertically disposed a pair of rod supporting frames 27 and 28 being appropriately spaced apart from each other in the feed direction. To rod supporting frames 27 and 28 there are fixed plural guide rods 29 (four guide rods in the figures) extending in the feed direction, being appropriately spaced apart from each other in the direction perpendicular to that of material feed, and parallel to each other. On guide rods 29 there is disposed a cylindrical travelling case 30 extending vertically or perpendicular to the material feed direction at a position roughly midway therebetween. Cylindrical travelling case 30 is supported, so as to be slidable in the material feed direction, by a guide block 31 projecting horizontally at the upper position and by another guide block 32 projecting horizontally at the lower position. At top of the travelling case 30, there is fixed a fixed cutter holder 34 having a hole 33, through which material 19 to be cut passes, projecting from the top end of rod supporting frames 27 and 28. Fixed cutter holder 34 is a part of a cutter portion 21, to which a fixed cutter 36 having a hole 35 in the same shape as that of the hole 33 is fixed. In the body of fixed cutter 36, there is formed a movable cutter insertion hole 37 communicating with hole 35 and extending in the longitudinal direction of travelling case 30. The cutting edge of movable cutter 38 can be inserted into the movable cutter insertion hole 37 in order to cut material 19 in cooperation with fixed cutter 36. The base portion of movable cutter 38 is fixed to movable cutter holder 40 by a bolt 39. Holder 40 is inserted into a hole formed in the central portion of a cylindrical movable axle 41, which is slidably fitted to the bore of travelling case 30, and is fixed there by a pin 42. Further, the movable axle 41, as described later, is moved up and down by the double-acting hydraulic cylinder 24 attached to the other end of travelling case 30. Near the midpoint of the above-mentioned travelling case 30, there is disposed a bracket 43 projecting toward the left as seen in FIGS. 2 and 3. One end of connecting link 44 is pivotably fitted to bracket 43 via a pin 45.

The lower end of case 30 is coaxially attached to double-acting hydraulic cylinder 24. One end portion of a piston rod 60 actuated by hydraulic cylinder 24 is connected integrally with the lower end of movable axle 41. The base portion of piston rod 60 is formed integrally with a piston 62 slidably inserted into a cylinder body 61, dividing the cylinder into a first chamber 61a (the upper side in FIGS. 2 and 4) and a second chamber 61b (the lower side in FIGS. 2 and 4). A first connection pipe 65 and a second connection pipe 66 are connected to ports 63 and 64 formed through cylinder body 61 to supply a high pressure working fluid to chambers 61a and 61b, such as compressed air or pressurized oil, through rotary valve 25, as described later. Further, in FIG. 2, reference numeral 30a denotes an air vent communicating with the atmosphere to relieve pressure due to motion of movable axle 41 from the lower part of travelling case 30. Further, in this embodiment, an air muffler (not shown) is attached to the outside of this air communication hole 30a, to reduce noise produced therefrom.

When second chamber 61b is charged with working fluid from second connection pipe 66 and working fluid is discharged from first chamber 61a through first connection pipe 65 piston 62 moves upward so that movable cutter 38 shears material 19 in cooperation with fixed cutter 36. When the working fluid is supplied from first connection pipe 65 into first chamber 61a and discharged from second chamber 61b through second connection pipe 66 piston 62 moves downward so that movable cutter 38 separates from material 19. The working fluid is charged into or discharged from each chamber under the control of two-way rotary valve 25 in coordination with the horizontal movement of travelling case 30.

Next will be described two-way rotary valve 25 operating the double-acting cylinder, to move the movable cutter up and down.

First and second connection pipes 65 and 66 are connected to two-way rotary valve 25 driven by motor 22. In more detail, valve body 67 of rotary valve 25 is mounted on bed 26, as shown in FIG. 4. Within a rotary compartment 68 formed within valve body 67, there is rotatably housed a roughly cylindrical spool-like rotor 69, the outer diameter of which matches the inner diameter of the rotary compartment. At either end of rotor 69, there are integrally provided axle portions 69a and 69b rotatably supported by valve body 67, and to the axle portion 69a projecting outside of the valve 25 there is fitted a driven gear 71 engaging a driving gear 70 fixed to the closer end of rotary shaft 58 of motor 22. Further, gears 70 and 71 have the same diameter so that rotary shaft 58 may rotate in one-to-one synchronization with rotor 69; however, without being limited to this, it is possible to ensure appropriate rotary synchronization by using other transmission means such as a sprocket wheel and a chain or a timing pulley and a timing belt, etc.

As depicted in FIGS. 4–8, rotor 69 is formed with a first large-diameter portion 69c having a first uniradial passage 90, a first small-diameter portion 69d having a first triradial passage 80, a second large-diameter portion 69e with a second uniradial passage 91, and a second small-diameter portion 69f with a second triradial passage 81. Further, rotor 69 is so constructed that a first communication hole 86 formed along the axis of the rotor communicates between the first uniradial passage 90 and the first triradial passage 80 and that a second communication hole 87 formed along the axis of the rotor communicates between the second uniradial passage 91 and the second triradial passage 81. In this description, the expressions "uniradial" and "triradial" can be interpreted respectively to mean "comprising a single radius" and "comprising a plurality of separate radii".

The valve body 67 is formed with a first pressure port 76, a first drain port 78, a first small arc-shaped pressure pocket 72 communicating with the first pressure port, and a first large arc-shaped drain pocket 74 communicating with the first drain port at the axial position where the first large-diameter portion 69c of the rotor is located.

Valve body 67 is further formed with a first output port 84 and a first annular pocket 82 between the exterior of first small-diameter portion 69d and the interior of body 67 communicating with first output port 84 at the axial position where first small-diameter portion 69d is located.

Further, valve body 67 is formed with a second pressure port 77, a second drain port 79, a second small arc-shaped pressure pocket 73 communicating with the second pressure port 77 and a second large arc-shaped drain pocket 75 communicating with the second drain port 79 at the axial position where the second large-diameter portion 69e of the rotor is located.

Valve body 67 also includes a second output port 85 and a second circular pocket 83 communicating with the second output port 85 at the axial position where the second small-diameter portion 69f of the rotor is located.

Figure 5:
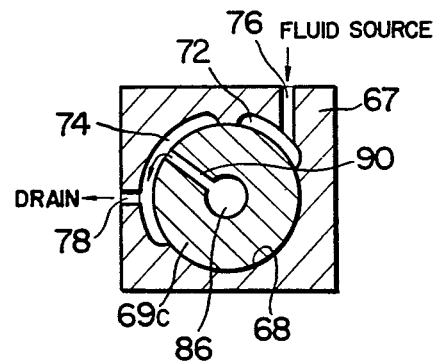
FIG. 5 is a cross-sectional view taken along the lines V—V in FIG. 4.
Figure 6:
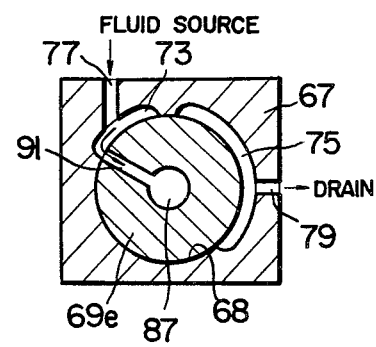
FIG. 6 is a cross-sectional view taken along the lines VI—VI in FIG. 4.
Figure 7:
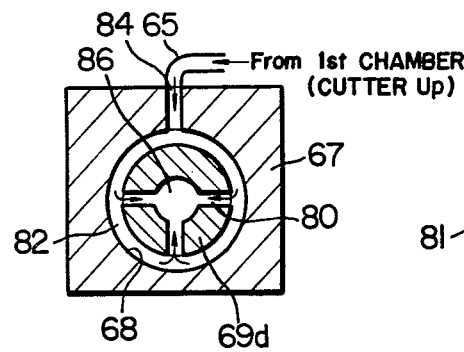
FIG. 7 is a cross-sectional view taken along the lines VII—VII in FIG. 4.
Figure 8:
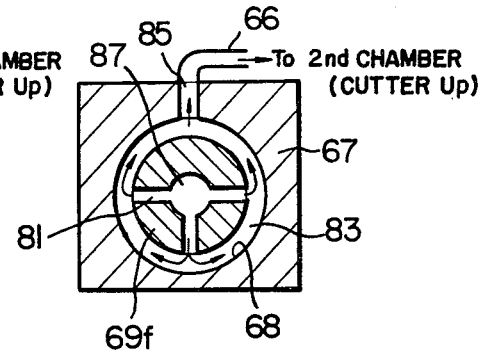
FIG. 8 is a cross-sectional view taken along the lines VIII—VIII in FIG. 4.

Pressure pockets 72 and 73, drain pockets 74 and 75, and uniradial passages 90 and 91 are radially dimensioned and positioned such that when either passage communicates with the corresponding pressure pocket, the other passage communicates with its corresponding drain pocket, and drain pockets 74 and 75 cover more of the circumference of rotary valve 25 than pressure pockets 72 and 73, as shown in FIGS. 5 and 6.

The first and second pressure ports 76 and 77 are connected to a high-pressure working fluid source (not shown).

The first output port 84 is connected to first chamber 61a of the double-acting hydraulic cylinder through first connection pipe 65, and second output port 85 is connected to second chamber 61b of the double-acting hydraulic cylinder through second connection pipe 66.

Now follows a description of the operation of the shearing machine thus constructed according to the present invention:

In order to shear a continuously-fed material with the shearing machine, material 19 first passes through hole 33 formed in fixed cutter holder 34 and hole 36 of fixed cutter 36. Next, reciprocating mechanism 23 is operated by adjustable-speed motor 22 at an oscillation rate according to the material feed speed. When connecting link 44 of reciprocating mechanism 23 moves horizontally, travelling case 30 and double-acting cylinder 24 also move together horizontally along guide rods 29.

The rotary valve 25 is also rotated by adjustable-speed motor 22 via gears 70 and 71.

Now, there is described the operation of two-way rotary valve 25 when movable cutter 38 moves upward. A working fluid is fed from the high-pressure working fluid source through second pressure port 77 of rotary valve 25, second pressure pocket 73, second uniradial passage 91, second communication hole 87, second triradial passage 81, second annular pocket 83 and second output port 85, to second connection pipe 66, and next charged into second compartment 61b in cylinder body 61 through port 64. Also, working fluid within the first compartment 61a of cylinder body 61 is fed to rotary valve 25 through port 63 and first connection pipe 65, and next discharged through first output port 84 of the rotary valve first annular pocket 82, first triradial passage 80, first communication hole 86, first uniradial passage 90, first drain pocket 74 and first drain port 78 into a drain tank. In response to the resulting pressure difference between chambers 61a and 61b, movable axle 41 moves upward in FIGS. 2 and 4, so that movable cutter 38 engages fixed cutter 36 to cut off material 19. The directions in which the fluid flows through each of the elements of valve 25 are shown by the arrows in FIGS. 5-8.

In this cutting step, it is necessary to synchronize the horizontal speed of the movable and fixed cutters with that of the material to be cut, at least while the cutters are shearing the material and until the movable cutter clears the material after shearing. Accordingly, reciprocating mechanism 23 should be slightly offset in the direction of delaying the return stroke of the reciprocating mechanism until after movable cutter 38 clears the material. This offset can be adjusted to match material size and feed rate.

After cutter support portion 21 is moved to uppermost position, since the rotor 69 continues to be rotated by motor 22, in contrast with the case mentioned above, the working fluid is fed from the high pressure working fluid source, through first pressure port 76 of rotary valve 25, first pressure pocket 72, first uniradial passage 90, first communication hole 86, first triradial passage 80, first annular pocket 82 and first output port 84, to first connection pipe 65, and next charged into first chamber 61a in cylinder body 61 through port 63. Also, working fluid within second compartment 61b of cylinder body 61 is fed to rotary valve 25 through port 64 and second connection pipe 66, and next discharged through second output port 85 of rotary valve 25, second annular pocket 83, second triradial passage 81, second communication hole 87, first uniradial passage 91, second drain pocket 75 and second drain port 79 into a drain tank. In response to the resulting pressure difference, movable axle 41 moves downward in FIGS. 2 and 4, so that movable cutter 38 separates from the fixed cutter. In this case, the directions in which the fluid flows through the elements of the rotary valve 25 are those opposite to the directions shown by the arrows in FIGS. 5-8.

Further, once movable cutter 38 is completely clear of material 19, it is unnecessary to synchronize the horizontal speed of the movable and fixed cutters with that of the material to be cut.

Further, in the movement stroke range of the travelling case 30 other than the range within which the travelling case moves in synchronization with the material feed speed to shear material 19, the working fluid within each chamber 61a or 61b of the double-acting cylinder 24 is not charged into or discharged from the cylinder, because the first uniradial passage 90 communicates with neither first pressure port 72 nor first drain pocket 74 and also because second uniradial passage 91 communicates with neither second pressure port 73 nor second drain pocket 75. Since the movement described above is repeated, it is possible to repeatedly cut material 19 into appropriate predetermined lengths accurately.

As described above, in the shearing machine according to the present invention, since the cutter supporting portion is moved horizontally along plural guide rods by the reciprocating mechanism driven by the motor so as to match material feed speed and is moved vertically along the travelling case by double-acting cylinder so as to cut off the material, and since the double-acting cylinder is operated by the working fluid controlled through the two-way rotary valve driven by the motor in conjunction with the movement of the reciprocating mechanism, it is possible to accurately synchronize the horizontal speed of the cutter supporting portion with the material feed speed during the shear cycle, and to cut the material into short lengths using relatively low power.

Further, since the two-way rotary valve is mechanically driven by the motor directly without using any electromagnetic valves, it is possible to control the double-acting hydraulic cylinder quickly without appreciable response delay, in other words, to cut the material into short lengths, accurately.

It will be understood by those skilled in the art that the forgoing description is in terms of preferred embodiments of the present invention wherein various changes and modifications may be made without departing from the spirit and scope of the invention, as is set forth in the appended claims.

What is claimed is:

1. A shearing machine having a movable cutter and a fixed cutter coacting to cut off a continuously fed material into given lengths, comprising:

(a) an adjustable-speed motor, having a drive shaft, for driving the shearing machine,
(b) at least one guide rod mounted on frame means to guide the movable and fixed cutters in a direction generally parallel to the feed path of said continuously fed material;
(c) a traveling assembly reciprocable along said guide rod, said travelling assembly including:
a travelling case;
a fixed-cutter holder secured to an end of said case fixedly supporting the fixed cutter thereon;
a movable-cutter holder supporting the movable cutter on the case;
a movable axle supporting said movable-cutter holder, said movable axle being movable within said travelling case in a direction substantially perpendicular to the feed path of said material; and
a piston rod connected to said movable axle;
(d) a double-acting hydraulic cylinder connected to said piston rod to move said movable cutter in the perpendicular direction;
(e) a reciprocating mechanism for moving said travelling assembly along said guide rods at substantially the same speed as said material, said reciprocating mechanism including:
a crank lever affixed at one end to said drive shaft;
a flying slide rotatably supported at the other end of said crank lever by an axle;
a slide link slidably fitted to said flying slide, one end of said link being pivotably supported on the shearing machine; and
a connecting link rotatably connecting the other end of said slide link to said travelling assembly, rotation of said crank lever causing said slide link to oscillate and said connecting link to reciprocate to drive said travelling assembly; and
(f) a two-way rotary valve to charge or discharge a working fluid into or from said double-acting hydraulic cylinder, said two-way rotary valve being opened or closed by said adjustable-speed motor in coordination with and at substantially the same cyclical period as movement of said reciprocating mechanism.

2. The shearing machine as set forth in claim 1, wherein said double-acting hydraulic cylinder comprises:
(a) a cylinder body having a first port and a second port into or from which a working fluid can be charged or discharged;
(b) a piston connected to the movable cutter, said piston forming a first chamber having the first port and a second chamber having the second port.

3. The shearing machine as set forth in claim 1, wherein said two-way rotary valve comprises:
(a) a pressurized fluid source;
(b) a rotor having a first large-diameter portion with a first uniradial passage, a first small-diameter portion with a first triradial passage, a second large-diameter portion with a second uniradial passage, and a second small-diameter portion with a second triradial passage, a first communication hole being formed along the axis of said rotor to communicate the first uniradial passage with the first triradial passage and a second communication hole being formed along the axis of said rotor to communicate the second uniradial passage with the second triradial passage, said rotor being driven by said adjustable-speed motor;
(c) a valve body rotatably supporting said rotor, said valve body being provided with a first pressure port, a first drain port, a first small arc-shaped pressure pocket communicating with the first pressure port, and a first large arc-shaped drain pocket communicating with the first drain port at the axial position where the first large-diameter portion of said rotor is located, a first output port and a first circular pocket communicating with the first output port at the axial position where the first small-diameter portion of said rotor is located, a second pressure port, a second drain port, a second small arc-shaped pressure pocket communicating with the second pressure port, and a second large arc-shaped drain pocket communicating with the second drain port at the axial position where the second large-diameter portion of said rotor is located, and a second output port and a second circular pocket communicating with the second output port at the axial position where the second small-diameter portion of said rotor is located, the first and second output ports being respectively connected to the first and second ports of said hydraulic cylinder for fluid transfer therebetween, the first and second fluid ports being connected to the pressurized fluid source for fluid transfer therefrom; and
the first and second pressure ports, the first and second drain ports, and the first and second uniradial passages being radially positioned and dimensioned such that when either of the uniradial passages communicates with the corresponding pressure port, the other uniradial passage communicates with its corresponding drain port, and the drain ports cover more of the circumference of the corresponding large-diameter portion than the pressure ports.

4. The shearing machine of claim 1, wherein said crank and slide link are offset so that the axle affixed to the crank lever travels in a greater arc length in a feed direction parallel to the feed path to achieve generally synchronous constant speed of said cutter during cutting engagement with said material, and return to an upstream or starting position in a shorter arc length.

* * * * *